K. F. KINGWELL.
MOTOR CONTROL SYSTEM.
APPLICATION FILED SEPT. 25, 1912.
Reissued Oct. 29, 1912.
13,483.
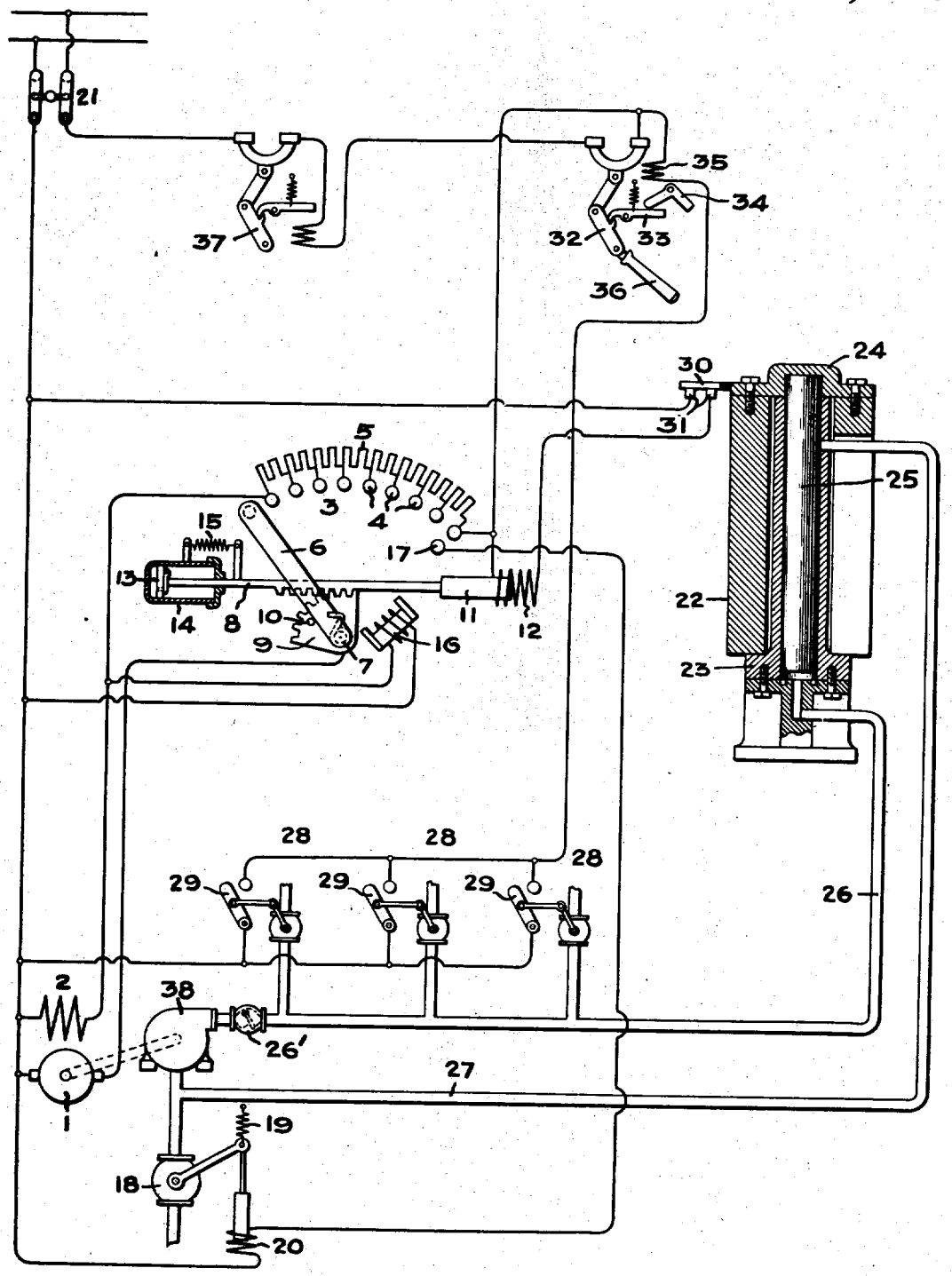
WITNESSES:
Marcus L. Byng.
Earl S. Klock
INVENTOR:
KENNETH F. KINGWELL,
BY Albert G. Davis
HIS ATTORNEY.

UNITED STATES PATENT OFFICE.

KENNETH F. KINGWELL, OF RUGBY, ENGLAND, ASSIGNOR TO GENERAL ELECTRIC COMPANY, A CORPORATION OF NEW YORK.

MOTOR-CONTROL SYSTEM.

13,483. Specification of Reissued Letters Patent. Reissued Oct. 29, 1912.

Original No. 1,022,029, dated April 2, 1912, Serial No. 536,290. Application for reissue filed September 25, 1912. Serial No. 722,372.

*To all whom it may concern:*

Be it known that I, KENNETH F. KINGWELL, a subject of the King of Great Britain, residing at Rugby, England, have invented certain new and useful Improvements in Motor-Control Systems, of which the following is a specification.

This invention relates to the control of electric motors, and more particularly to the control of motors operating pumps, compressors and other kinds of apparatus used for storing energy and transmitting motion.

One of the objects of my invention is to automatically regulate the mechanism so that when the accumulator falls, owing to the operation of one or more of the machines operated by the fluid in the accumulator, the pump will be brought into operation automatically to restore the accumulator; and also, after fully restoring the accumulator, to automatically stop the motor. The arrangement is such that while any machine is in operation to consume the water and deplete the accumulated fluid, the motor will not be stopped when the fluid reaches a predetermined point in the accumulator.

In the accompanying drawing I have shown my invention embodied in concrete mechanism for purpose of illustration.

Referring to the drawing, 1 represents a motor armature which I have shown for purposes of illustration as a shunt motor, provided with a field 2. A rheostat 3 comprising a plurality of studs 4 forms the terminals for the starting resistance 5, is arranged in the armature circuit of the motor so as to bring the motor up to running speed. This rheostat is arranged to operate automatically and comprises an arm 6 pivoted at 7 and spring pressed to the off position. The arm is moved to the running position by means of a rack 8 engaging a segmental gear 9 likewise pivoted at 7. The segment moves the arm by engaging it with a pin 10 mounted in the segment and projecting upward into the path of the arm. The arrangement is such that the segment will move the arm to the right or in a clockwise direction, but will return without moving the arm. The rack 8 is elongated so as to form at one end a plunger 11, acting as a core for solenoid 12. The opposite end of the rack is provided with a piston 13 operating in a cylinder 14. The piston is provided with a valve which permits the rack to travel quickly to the left, but necessitates a slow movement in the opposite direction. A spring 15 normally returns the rack to the left into the position shown. A no-voltage magnet 16 is provided for holding the arm 6 in running position and an auxiliary stud 17 is arranged to be engaged by the arm in running position for purposes hereinafter described.

The motor 1 is arranged to drive a pump or compressor 38 in the well-known manner as, for instance, by means of a belt. The suction valve 18 of this pump is arranged to be operated automatically by means of a spring 19 which normally closes the valve when the solenoid 20 is deënergized. One terminal of the solenoid 20 is connected with auxiliary stud 17, while the other terminal is connected with the line through the switch 21. The pump discharges into an accumulator 22, which may be of any desired construction. The accumulator shown comprises a stationary member 23, forming a container, and a movable member 24 provided with a plunger 25 operating within the container. The discharge from the pipe enters the accumulator at the bottom through the pipe 26 which is provided with a check valve 26'. A pipe 27 entering the top of the accumulator forms a by-pass through which fluid returns when the accumulator is filled to the desired point. A number of machines 28, such for instance, as presses, are arranged to be fed from the pipe 26 as shown. At each machine is a switch 29 arranged to be closed by the operator when the machine is operated. I have shown the switches interlocked with the starting members of the machine so that the switch will always be closed when the machine is started.

The movable member of the accumulator carries an arm 30 of conducting material, which is insulated from the accumulator. This arm is arranged to bridge the contacts 31 to start the motor when the fluid in the accumulator falls to a predetermined point. This arm 30 is likewise arranged to open and close the circuit breaker 32. This circuit breaker is held closed by the latch 33 and a bell crank lever 34 is pivoted adjacent to the latch for tripping the same. In the position of the bell crank shown in the drawing, when the member 30 reaches the lever 34, it will rotate the lever on its axis and trip the circuit breaker. A magnetic coil 35 is arranged adjacent the bell crank lever so that when the coil is energized it will attract one arm of the bell crank lever and rotate it out of the path of the arm 30. The handle 36 of the circuit breaker is arranged to be engaged by the member 30 to close the circuit breaker as the movable member of the accumulator falls. An overload circuit breaker 37 is likewise provided for purposes well known in the art.

The arrangement of circuits and mode of operation are as follows, assuming that the switch 21 is closed and that the fluid in the accumulator has fallen to the point shown in the drawing, in which the contacts 31 are bridged. In this position, the solenoid 12 will be energized from the positive main, through contacts 31 directly to the negative main through the circuit breakers 32—37. This immediately moves the arm 6 over the studs 4 to start the motor. The suction valve, however, is not opened until the arm 6 engages the stud 17, closing the circuit from the positive main through the solenoid 20, stud 17, arm 6, studs 4, and back to the negative main. The suction valve being open, the pump continues to operate and the movable member of the accumulator rises. As soon as the member 30 leaves the contacts 31 the solenoid 12 is deënergized, permitting the rack and segmental gearing to be returned by the spring 15 to the left. The arm 6 does not, however, return since it is held in running position by the magnet 16. Assuming that no machines are being used and the switches 29 are all open, the accumulator will rise until the member 30 engages the bell crank lever 34 and opens the circuit breaker, whereupon the motor will be stopped and the arm 6 returned to off position. When any of the machines are started so as to consume fluid and the accumulator falls, the arm 30 will engage the circuit breaker handle 36 to close the circuit. The motor will not start, however, since the controlling arm 6 is in the off position and the suction valve 18 has been closed by the spring 19. When the accumulator falls to a predetermined point in which the contacts 31 are bridged the motor will be started as before. The closing of the suction valve takes the load off the motor so that what fluid is left between the suction valve and the pump is used up in slowing down the motor, insuring that the motor will not have to start up under load.

In order to eliminate the series of stops and starts which would result if one or more machines were working, and the accumulator were raised to a predetermined point, the switches 29 and the magnet coil 35 are provided. Assuming now that one machine is in operation so that one switch 29 is closed: the closing of the switch 29 energizes coil 35 and draws the lever 34 out of the path of the arm 30. If, now, the accumulator should rise, the circuit breaker will not be opened, and the surplus fluid will flow through the by-pass back to the pump thereby relieving the load on the motor. When, however, the last machine is stopped, the lever 34 is released, so that the circuit breaker will be opened, as before.

It will be seen that I have provided a simple and efficient means for starting and stopping a pumping system without interfering with the work of the operator.

I have described the apparatus as used in connection with a pump for pumping fluid, but it should be understood that the term "fluid" is used in a broad sense.

The apparatus is shown in a more or less diagrammatic way for purposes of illustration and it should be understood that I do not limit my invention to the particular construction and mode of operation shown and described except in so far as it is limited by the scope of the claims annexed hereto.

What I claim as new and desire to secure by Letters Patent of the United States, is:—

1. The combination with an electric motor and a pump driven thereby, of an automatic starter for said motor, an electromagnetically operated valve for controlling the supply of fluid, an accumulator for storing fluid, a circuit breaker for opening the motor circuit, means for automatically tripping the circuit breaker when the fluid in said accumulator reaches a predetermined point and for automatically operating the valve when it reaches a second predetermined point, and means for preventing the operation of the circuit breaker while the supply of fluid is being consumed.

2. The combination with an electric motor and a pump driven thereby, of an accumulator for storing fluid, a valve controlling the consumption of fluid from said accumulator, a circuit breaker arranged to be automatically opened when the fluid in said accumulator reaches a predetermined point and connections whereby the automatic opening of said circuit breaker is prevented while the valve is closed.

3. The combination with an electric motor and a pump driven thereby, of an accumulator for storing fluid, a plurality of valves controlling the consumption of fluid from said accumulator, a circuit breaker arranged to be automatically opened when the fluid in said accumulator reaches a predetermined point and connections whereby the automatic opening of said circuit breaker is prevented while any one of said valves has closed.

4. The combination with an electric motor and a pump driven thereby, of an accumulator for storing fluid, a circuit breaker arranged to be automatically opened when the fluid in the accumulator reaches a predetermined point, and means for preventing the operation of the circuit breaker at said point while the stored fluid is being consumed.

5. The combination with an electric motor and a pump driven thereby, of an accumulator for storing fluid, an automatic starter for said motor arranged to be operated when the fluid in the accumulator reaches a predetermined point, a circuit breaker arranged to be automatically opened when the fluid in the accumulator reaches a second predetermined point, and means for preventing the operation of the circuit breaker while the stored fluid is being consumed.

6. The combination with an electric motor and a pump driven thereby, of an accumulator for storing fluid, a circuit breaker arranged to be automatically operated when the fluid in said accumulator reaches a predetermined point in the accumulator, a plurality of switches arranged in parallel, and connections whereby the automatic opening of said circuit breaker is prevented when any one of said switches is closed.

7. The combination with an electric motor and a pump driven thereby, of an accumulator for storing fluid, a circuit breaker arranged to be automatically operated when the fluid in said accumulator reaches a predetermined point in said accumulator, a plurality of switches, and connections whereby the automatic opening of said circuit breaker is prevented when any one of said switches is operated.

In witness whereof, I have hereunto set my hand this 31st day of August, 1912.

KENNETH F. KINGWELL.

Witnesses:
CHARLES H. FULLER,
J. A. FOSTER.